J. W. MIXTER.
SAW GUMMERS.
No. 179,594.        Patented July 4, 1876.
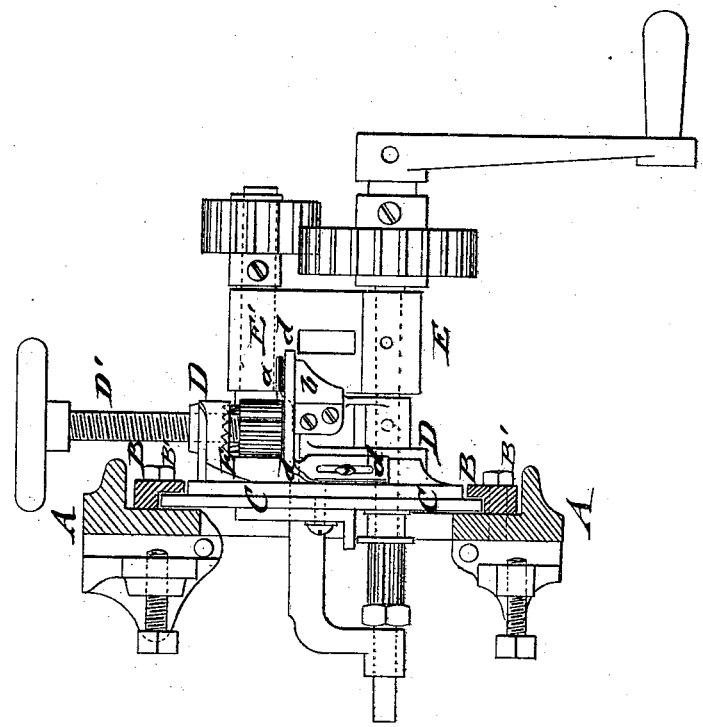
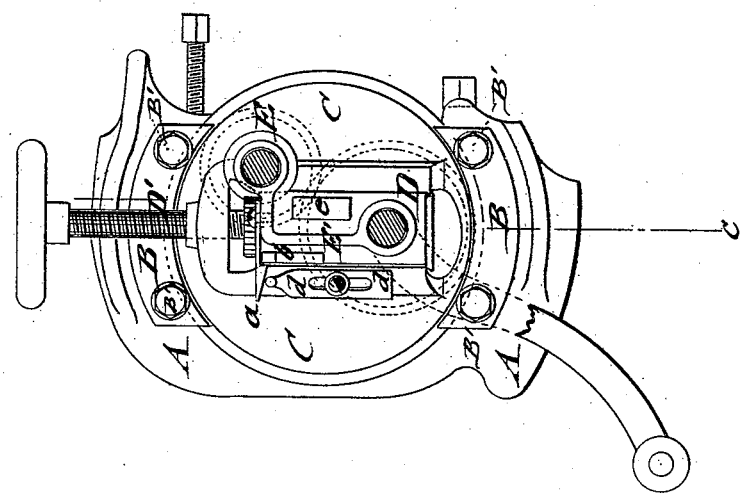
WITNESSES:
INVENTOR:
ATTORNEYS.

UNITED STATES PATENT OFFICE.

JASON W. MIXTER, OF TEMPLETON, MASSACHUSETTS.

IMPROVEMENT IN SAW-GUMMERS.

Specification forming part of Letters Patent No. 179,594, dated July 4, 1876; application filed February 21, 1876.

*To all whom it may concern:*

Be it known that I, JASON W. MIXTER, of Templeton, in the county of Worcester and State of Massachusetts, have invented a new and useful Improvement in Saw-Gummer, of which the following is a specification:

In the accompanying drawing, Figure 1 represents a sectional side elevation of my improved saw-gummer, and Fig. 2 a vertical transverse section of the same on the line $e\ e$ of Fig. 1.

Similar letters of reference indicate corresponding parts.

My invention relates to such improvements in saw-gumming machines that they may be readily set to any angle of cutting in connection with a feed that may be controlled either automatically or by hand, as desired.

The invention consists in the construction and combination of parts which will be hereinafter more fully described, and then pointed out in the claims.

In the drawing, A represents the main frame of the saw-gummer, that is applied in the customary manner by jaws and clamp-screws to the straight, circular, or other saw to be gummed. The main frame A supports, by means of arc-shaped guide-flanges B, the disk-shaped carriage-way C, which may be moved into any position to allow the operation of the gummer at any desired angle or inclination. The carriage-way C is rigidly clamped in position, after being adjusted by the set-screws B' of the guide-flanges B. The cutter-shaft-supporting carriage D is fed forward in the guides of way C by a feed-screw, D', in the usual manner. The feed-screw D' is operated at greater or lesser speed by an intermeshing worm-feed wheel, E, which turns in bearings of a bracket, E', that swings by a sleeve on the lateral cutter-shaft. The worm-wheel E is revolved by changeable cog-wheels placed on the cutter and worm-wheel shafts, so that a greater or lesser speed of the feed is obtained. The swinging bracket E' is locked by a spring-hook, $a$, to a fixed support, $b$, of the carriage C until the hook is detached by contact with an adjustable gage, $d$, that is set to the exact depth to which the teeth of the saw are to be gummed. The contact of the bracket-retaining hook $a$ with the gage $d$ releases the same from the support, and admits the swinging of the bracket, so that the worm-feed wheel is thrown out of gear with the cog-wheel of the feed-screw, and thereby the action of the cutter interrupted. The hook may also at any time be released by hand from its seat or support so as to admit the instant interruption of the gumming operation, when required.

The swinging bracket E' is retained by a lug or seat, $e$, of carriage D when the worm-wheel is thrown out of gear, so as to prevent the swinging of the arm of the worm to too great a distance from the feed-screw. By carrying the bracket forward, so that the spring-hook locks on the support, the worm-wheel is brought back into gear with the feed-screw. The operating-gear of the worm remains always in gear, as its shaft swings into circle, and does not interrupt the intermeshing of the worm-wheel revolving cog-wheel.

Having thus described my invention, I claim as new and desire to secure by Letters Patent—

1. The combination of a wheel revolving in a swinging bracket of a cutter-shaft with the feed-screw of the carriage and with the cutter-shaft, to produce the forward feeding of the gumming-cutter, substantially as set forth.

2. The swinging worm-shaft, carrying bracket having spring-hook, in combination with a supporting lug and adjustable gage, to throw feed-wheel out of gear and interrupt feeding of cutter, substantially as described.

JASON W. MIXTER.

Witnesses:
C. F. RICHARDSON,
C. F. DENNISON.